Patented Sept. 2, 1924.

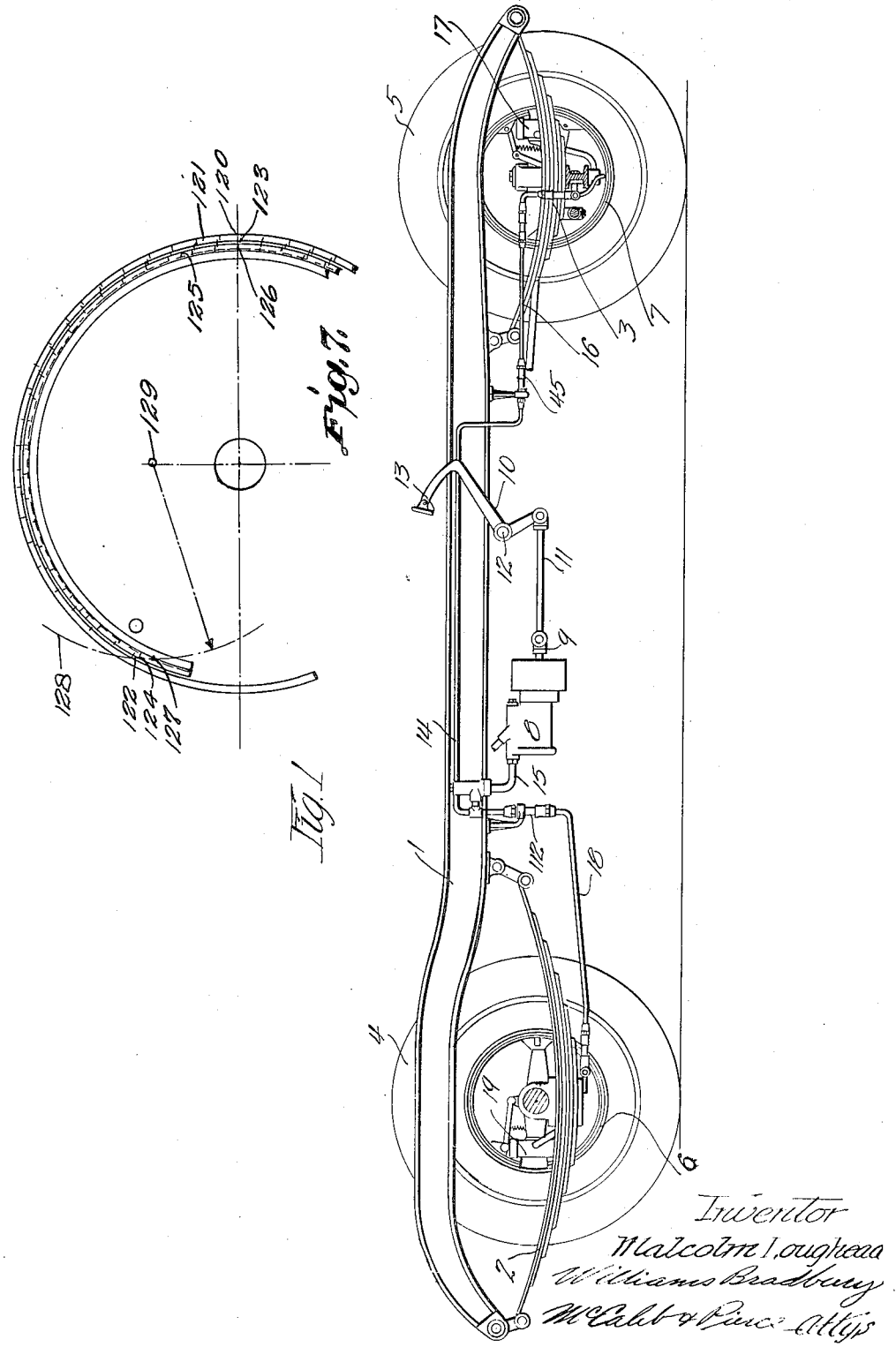

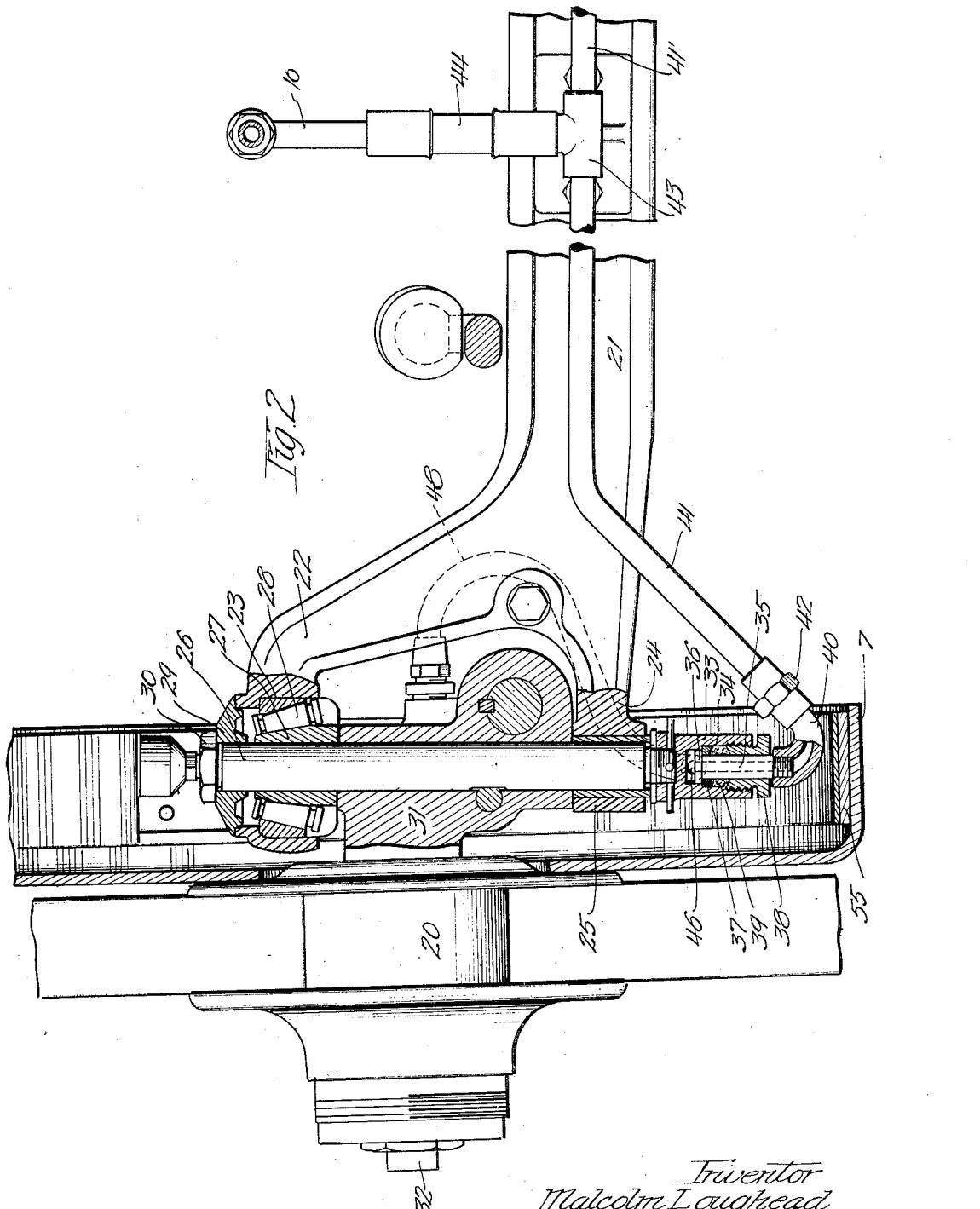

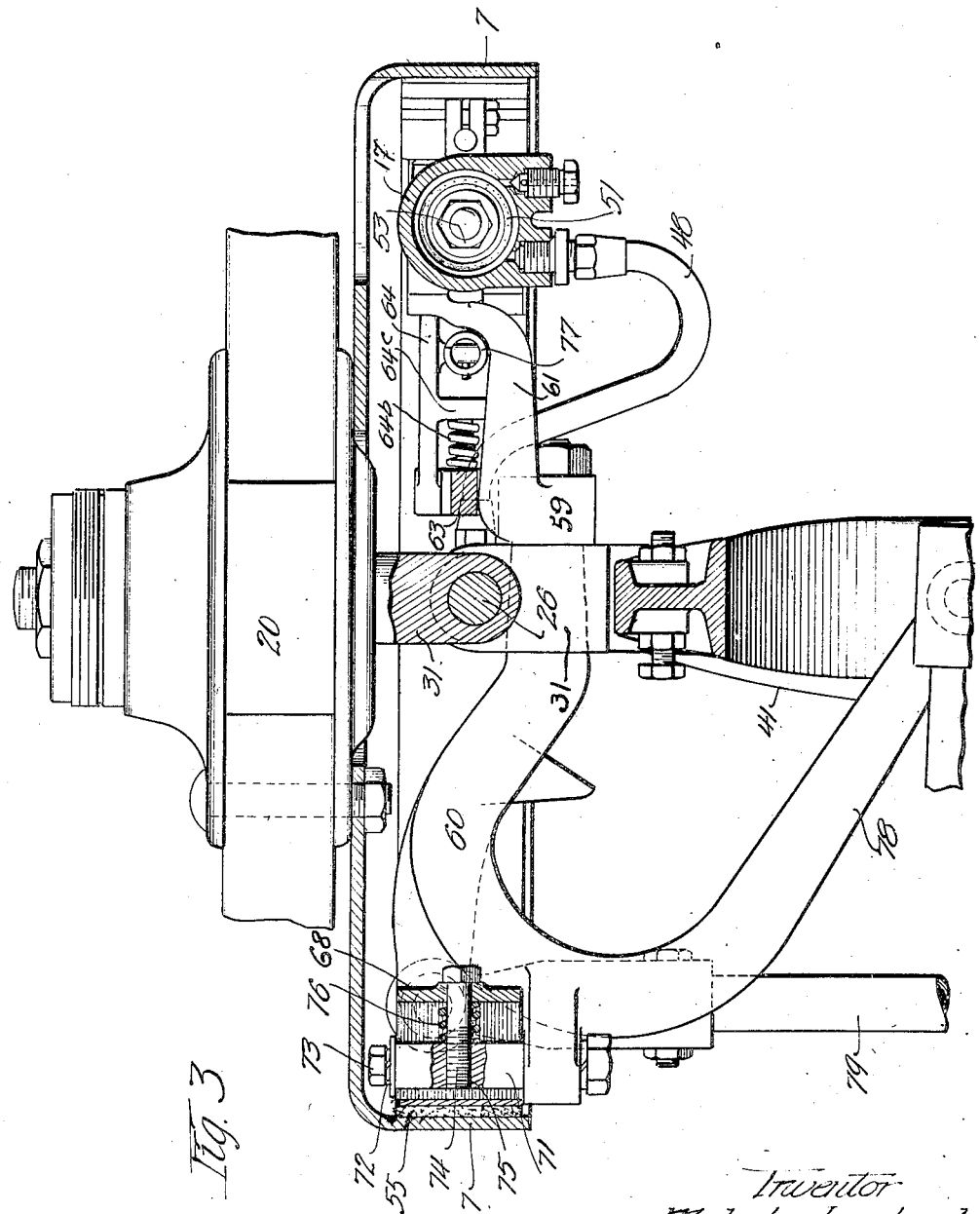

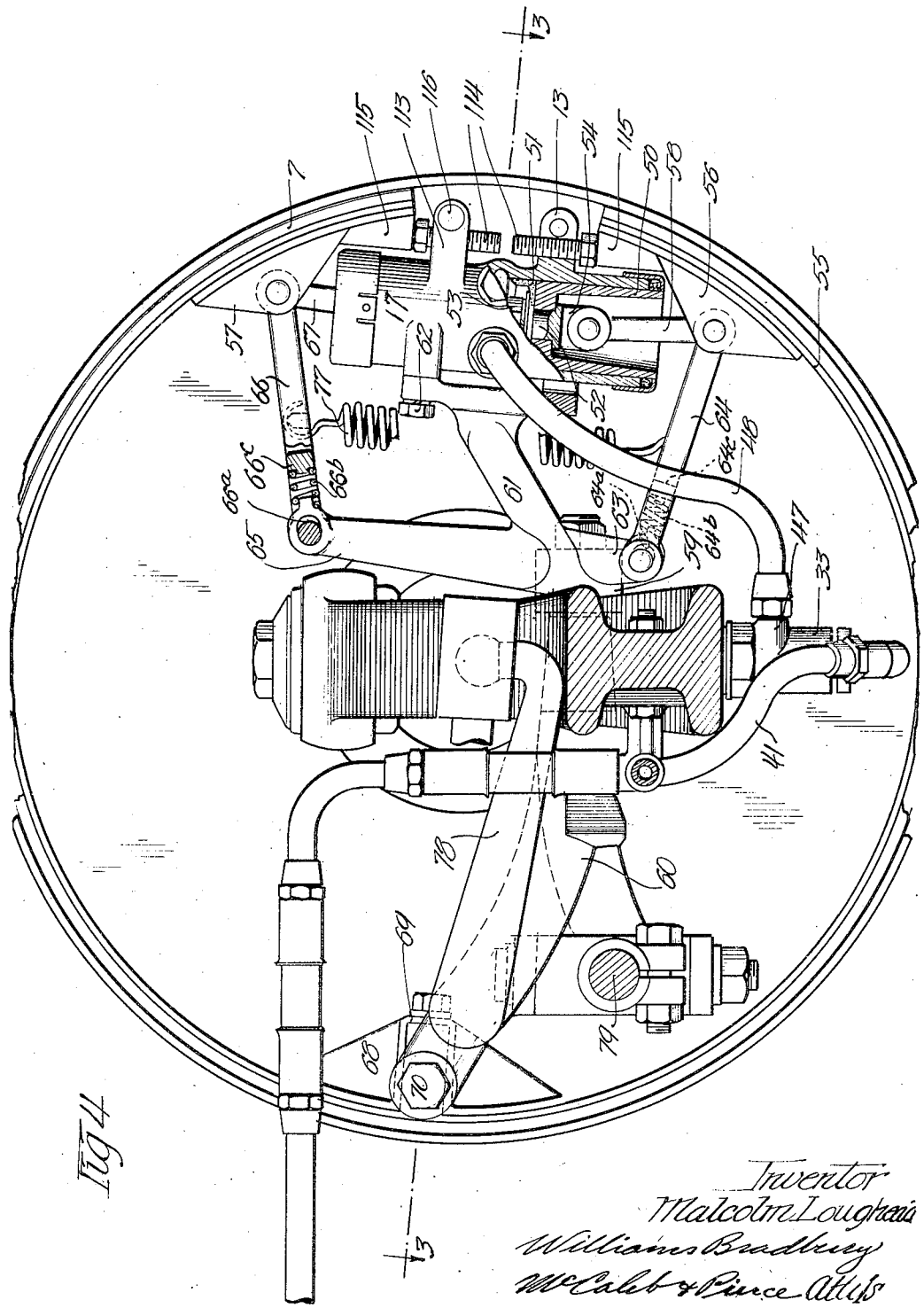

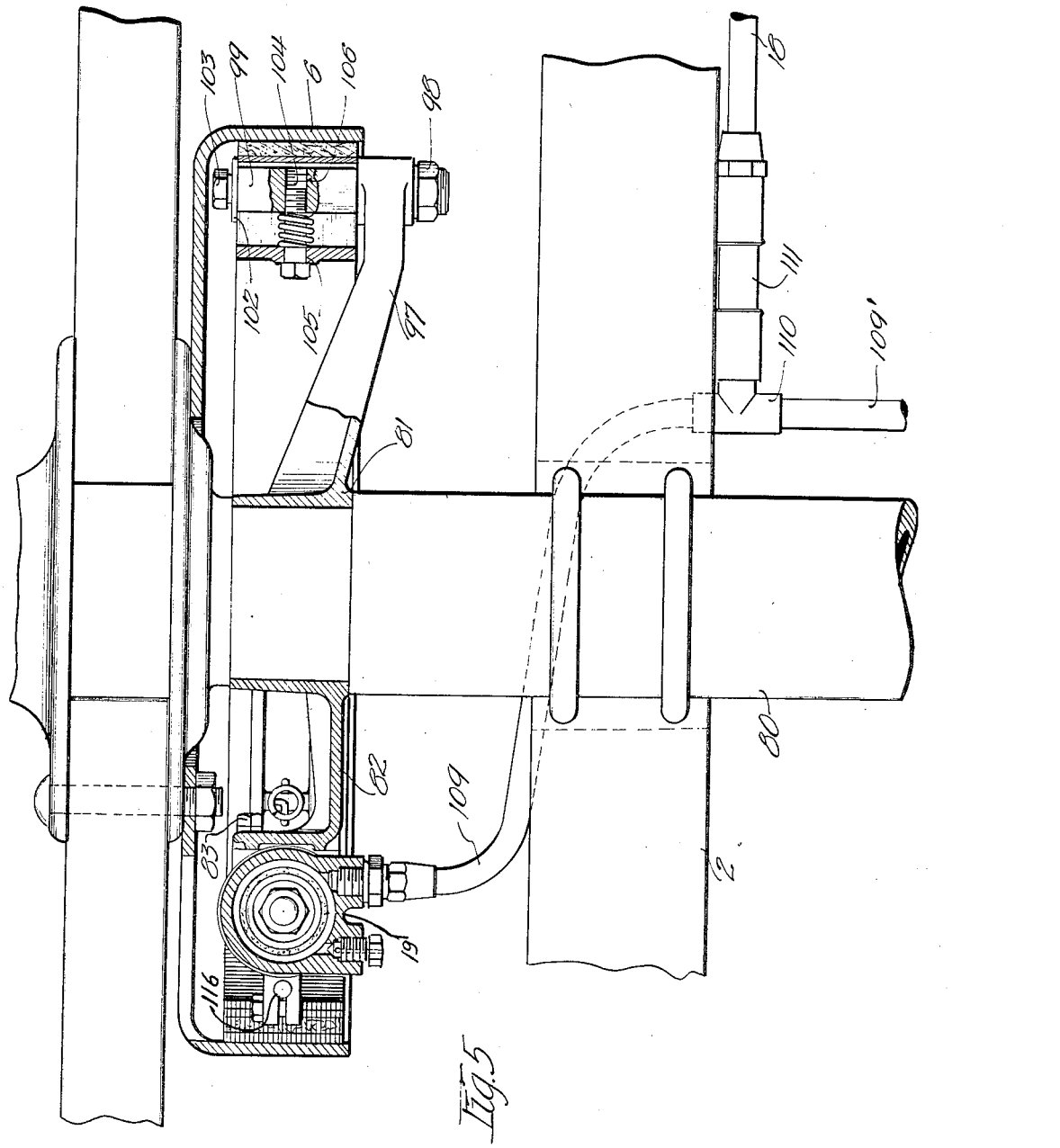

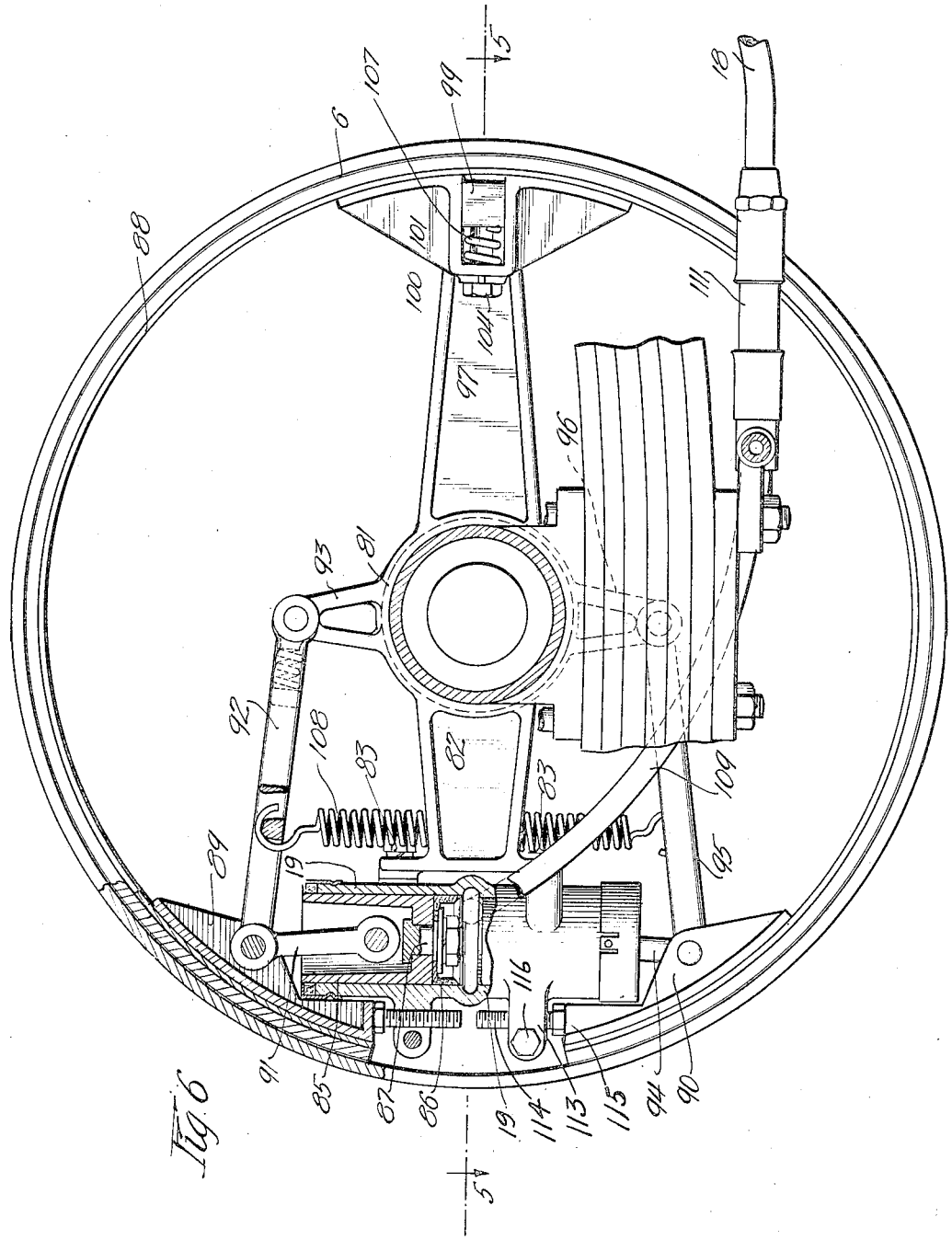

1,507,389

UNITED STATES PATENT OFFICE.

MALCOLM LOUGHEAD, OF DETROIT, MICHIGAN, ASSIGNOR, BY MESNE ASSIGNMENTS, TO HYDRAULIC BRAKE COMPANY, OF LOS ANGELES, CALIFORNIA, A CORPORATION OF CALIFORNIA.

BRAKING APPARATUS.

Application filed January 23, 1922. Serial No. 531,145.

*To all whom it may concern:*

Be it known that I, MALCOLM LOUGHEAD, a citizen of the United States, and resident of Detroit, in the county of Wayne and State of Michigan, have invented a certain new and useful Improvement in Braking Apparatus, of which the following is a full, clear, concise, and exact description, reference being had to the accompanying drawings, forming a part of this specification.

This invention relates to braking apparatus for vehicles, and particularly to the braking systems of the fluid operated type, although features of the invention are applicable to mechanically operated braking arrangements.

One of the features of the invention is the provision in a fluid operated braking system of oppositely operating piston members which act to apply substantially the same stress simultaneously to opposite ends of the brake band.

Another feature of the invention is the means provided for imparting to the end of the brake band a longitudinal thrust upon the application of braking pressure, thus tending to cause the entire brake band to engage the brake drum at substantially the same time and with equal pressure.

Another feature is the pipe line system comprising the comparatively rigid pipes supported on the chassis, and the relatively short lengths of flexible hose joining the lengths of rigid pipe to permit of the movement of the rigid pipes relative to each other occasioned by the operation of the springs.

Other features of the invention will appear as the structure and operation of the device is described.

Referring now to the drawings,

Figure 1 is a schematic view of a portion of the chassis and the left wheels of a motor vehicle, the front wheel being shown at the right;

Figure 2 is a substantially vertical section through the steering knuckle of the front wheel and adjacent parts;

Figure 3 is a transverse sectional view through the steering knuckle, brake band and cylinder of the left front wheel shown in Figure 1;

Figure 4 is a view of the brake drum and brake mechanism of the left front wheel as viewed from the right side with the chassis and springs omitted;

Figure 5 is a transverse, substantially horizontal section through the brake mechanism of the rear wheel of Figure 1, Figure 6 is a view of the brake mechanism of the rear wheel shown in Figure 1, as viewed from the right with the chassis and springs omitted, and Figure 7 is a diagrammatic view showing the manner of finding the point for pivoting the brake band link.

In internal brakes with which applicant is familiar, it has been customary in applying pressure to cause the operation of the brake band to apply the pressure in a direction substantially tangential to the band at a point adjacent to the ends. When the pressure is applied in his manner, it has been found that the ends of the band are caused to much more forcibly engage the brake drum than are the portions of the band adjacent to the middle thereof. It is also found that in many of the internal brakes of the prior art, pressure is applied more forcibly to one end of the band than to the other.

The present invention provides means whereby equal pressure is applied to the opposite ends of the band, and whereby the ends of the band are caused to move in an arc of a circle which intersects the circle of the brake drum and causes the band to practically simultaneously engage the drum throughout its entire length and with substantially the same pressure throughout. This structure will, therefore, avoid the objection which has been found to exist in many internal brakes of the brake band wearing out adjacent its ends in a very short time, and thus necessitating the renewal of the brake band merely because a portion of it had become worn when the greater portion of the band had been subjected to very little wear.

In the drawings, 1 represents one of the side members of the chassis. 2 and 3 represent the rear and front spring assemblies respectively, which may be joined to the side member in any desired manner. 4 and 5 indicate the rear and front wheels provided with the brake drums 6 and 7 respectively. 8 indicates the pressure producing cylinder of the fluid pressure system provided with the usual piston, having the piston rod 9 joined to the bell crank lever 10 by means of the link 11. The lever 10 is pivotally mounted at 12, and its upper arm is provided with a foot pedal 13. The cylinder 8, at the end remote from the piston rod 9, is connected to a fixed tube 14 by means of the tube 15. The tube 14 is connected at one end to a tube 16 which, through connections hereinafter to be described, is joined to the brake cylinder 17 at the front wheel. At the opposite end, the tube 14 is joined to a tube 18 which extends to the brake cylinder 19 of the rear wheel.

The front wheel is pivotally joined to the front axle bar 21 by means of a steering knuckle which may be of any approved construction. In the form shown in the drawings, the axle bar 21 is bifurcated adjacent its ends, the upper bifurcation 22 being formed to support the bearing cup 23. The lower bifurcation 24 of the axle bar is provided with a bearing 25. The pivot pin 26 of the steering knuckle, adjacent its upper end, passes through the bearing cone 27. Between the cup 23 and the cone 27 are the usual balls or rollers 28. About the upper end of the pivot pin 26 is a cover washer 29 secured in position by the nut 30.

Fixed about the pivot pin 26 between the bearing cone 27 and the bearing member 25 is a collar 31 to which is secured the axle 32 of the front wheel. Fixedly secured to the lower end of the pivot pin 26 in any desired manner, as by the threaded and pin arrangement illustrated in Figure 2, is the recessed member 33 which forms part of the pivot connection between the relatively stationary fluid pressure tube 41 and the movable parts carried on the steering knuckle. The member 33 is formed with a recess 34 arranged to receive the tube 35 which is provided with the head or flange 36. Fitting between the tube 35 and within the recess 34 is a packing ring 37. About the tube 35 and in screw threaded engagement with the recess 34 is a packing compression member 38 between which and the ring 37 is packing material 39. In screw threaded engagement with the lower end of the tube 35 is the hollow elbow 40 which is connected to the tube 41 by any well known fitting, as the pipe fitting indicated at 42.

The tube 41 extends upwardly and transversely parallel to the axle bar 21, and, if desired, may be fixedly secured to the axle bar. The tube 41 terminates in a T-connection 43 from one branch of which extends the tube 41' to the braking mechanism of the opposite front wheel. Connected to the third branch of the connection 43 is the pipe 16. Between the pipe 16 and the T-connection 43, a piece of flexible tubing or hose 44 may be provided. The tube 16 extends forwardly and downwardly as indicated in Figure 1. A section of flexible tubing or hose may be provided between the tube 16 and the tube 14 as at 45. These short lengths of flexible tubing are provided to take care of the variation in angle and distance between the sections of rigid tubing occasioned by the spring movement.

Extending from the upper end of the recess 34 is an opening 46 which terminates in a nipple 47 (Fig. 4). Secured to the nipple 47 in any desired manner is a tube 48 which extends upwardly and communicates with the brake cylinder 17 substantially midway of the length thereof.

Within the lower end of the cylinder 17 is a cup shaped piston member 50 provided with the cup leather 51. A bolt 52 extends through the adjacent portions of the piston 50 and cup leather which are clamped together by means of the bolt and its nut 53. The bolt 52 is provided at the lower end thereof with a perforated lug 54. Within the brake drum 7 is a brake band 55 provided adjacent its opposite ends with the lugs or brackets 56 and 57. Pivotally connected to the lug 54 at one end, and to the lug 56 at the other, is a link 58.

Carried by the steering knuckle member 31 are the bracket members 59 and 60. Projecting from the bracket 59 is an arm 61 to which is secured the cylinder 17 by means of the cap screws 62. The bracket 59 is also provided with a perforated lug 63 to which is pivotally connected one end of a link 64, the opposite end of the link 64 being pivotally joined to the bracket member 56 on the end of the brake band. From the bracket member 59, arm 65 extends upwardly. Pivotally joined to the upper extremity of the arm 65 is a link 66, the opposite end of which is pivotally connected to the lug or bracket member 57 fixed to one end of the brake band.

If desired, the link 66 may be provided with a slightly elongated or oval pivot bearing 66$^a$ and a relatively heavy coil compression spring 66$^b$ between the end of arm 65, and an abutment 66$^c$ carried by the link 66. This arrangement will avoid any possibility of the brakes jamming, for if there should be a tendency to jam, the spring 66$^b$ will give slightly to prevent it. The link 64 may also be provided with a similar elongated bearing 64$^a$, spring 64$^b$, and abutment 64$^c$.

Within the upper half of the cylinder 17 is a piston member which is substantially identical in all particulars with the one shown and described in the lower half of the cylinder, the upper piston member being pivotally joined to the bracket member 57 by means of the link 67. It will thus be seen that when fluid under pressure enters the cylinder 17 through the tube 48, it will act equally on both the pistons and both ends of the brake band will receive substantially the same stress.

The brake band 55 substantially midway between its ends is provided with a bracket member 68 within which is a slot 69. Secured to the arm 60, as by the bolt or screw 70, is a block 71 which is positioned within the slot 69. The block 71, at its end remote from the arm 60, is provided with a washer 72 secured in place by cap screw 73 which maintains the block within the slot 69. Passing through the bracket member 68 and into screw threaded engagement with the brake band is a screw 74. The screw 74 passes through an opening 75 in the block 71. Positioned about the screw 74 and between the block 71 and one end of the slot 69 is a spring 76 which tends to normally maintain the brake band out of engagement with the brake drum.

A spring 77, one end of which is joined to the link 66 and the other end of which is joined to the link 64, tends to force the pistons toward the central portion of the cylinder 17 and thus hold the ends of the brake band disengaged from the brake drum.

The arm 60 curves outwardly and inwardly and forms the steering yoke 78. Also secured to the arm 60 is one end of the tie rod 79.

The braking arrangement associated with the brake drums 6 of the rear wheels are similar in construction and operation to that described in connection with the fore wheel, with this difference, however, that the rear wheel in the ordinary vehicle is not provided with a steering knuckle. The brake parts are, therefore, preferably mounted on the end of the axle housing.

Referring now to Figure 5, 80 represents the axle housing about the end of which is secured the collar 81. Extending rearwardly from the collar 81 is a bracket member 82 to which is secured, in any desired manner, as by the cap screws 83, the cylinder 19. Within the cylinder 19 at one end is a piston 85 provided with a cup leather 86 which is secured thereto by the bolt 87. Secured to the opposite ends of the brake band 88 are the perforated bracket members 89 and 90. The piston 85 is connected to the bracket member 89 by means of the link 91. The link 92 joins the bracket member 89 to the perforated lug 93 carried by the collar 81.

The lower end of the cylinder 19 is provided with a piston of substantially the same character as that shown within the upper portion of the cylinder, a link 94 being arranged to join the piston within the lower portion of the cylinder to the perforated lug 90. A link 95 pivotally connects the bracket member 90 to a bracket member 96 carried by the collar 81.

Extending forwardly from the collar 81 is a bracket member 97 to which is secured, by the nut 98, a block 99 positioned within a slot 100 provided in the bracket member 101 which is secured to the brake band 88 substantially midway of its length. The block 99 is secured within the slot 100 by means of the washer 102 and cap screw 103. A screw 104 passes through an opening 105 in the bracket 101 and an opening 106 in the block 99, and has screw threaded engagement with the brake band 88. About the screw 104 and positioned between the block 99 and one end of the slot 100 is a spring 107 which normally tends to maintain the brake band 88 out of engagement with the brake drum.

A spring 108, one end of which is secured to the link 92 and the other end to the link 95, tends to force the pistons towards the central portion of the cylinder 19 and thus normally maintain the ends of the brake band out of engagement with the brake drum 6.

A tube 109 communicates at one end with the opening in the cylinder 19 substantially centrally thereof, the opposite end being joined to one branch of a T-connection 110. A tube 109' extends from a branch of the T-connection 110 to the brake mechanism of the opposite wheel. To the third branch of the T-connection 110 is joined the tube 18 through which fluid is distributed to the brake mechanism of the rear wheels.

A section of flexible tubing or hose 111 may be provided in the tube 18 adjacent the connection 110. Another section of flexible tubing 112 may be provided in the tube 18 adjacent its opposite end where it joins the fixed tube 14 (see Fig. 1).

Each of the cylinders is provided with a pair of screw threaded split lugs 113 into which are threaded the screws 114. The heads of these screws are arranged to engage abutments 115 fixed to the brake band adjacent the ends thereof, and thus permit adjustment of the normal slack in the brake band. After the screws 114 have been adjusted to provide the desired slack in the brake band, they may be retained in their adjusted position by the clamping bolts 116.

The operation of the system is as follows:

When it is desired to apply the brakes, fluid under pressure is forced into the tube 14. This may be accomplished by means of the lever 10, cylinder 8 and associated parts, or, if desired, pneumatic pressure stored by a generator driven by a moving part of the vehicle may be employed. The fluid under pressure passes from the tube 14 to the tubes 16 and 18, and thence through the branch tubes 41 and 41' to the brake cylinders 17 of the front wheels and through the branch tubes 109 and 109' to the brake cylinders 19 of the rear wheels. The fluid entering the cylinders causes the pistons of each pair to be moved from each other with equal force. This force is applied in opposite directions to the adjacent ends of the brake band, causing the brake band to expand. Due to the links at 64 and 66 of Fig. 4, and 92 and 95 of Fig. 6, the ends of the brake bands are not forced directly into contact with the brake drums upon the beginning of their movement but are caused to take a circular or arcuate path. By the proper designing of the length of the links, such as 64 and 66, and the proper selection of the pivot points for the end remote from the brackets carried by the ends of the brake bands, the brake bands may be caused to move bodily towards the side of the brake drum remote from the cylinder so that the central portion of the brake band will engage the brake drum at substantially the same time and with substantially the same pressure as do the portions of the band adjacent the ends.

The location of the pivot points for the ends of the guide links remote from the brake band may be found in different ways. One manner of approximately locating these points is as indicated in Figure 7.

The arcuate distance from a point 120 on the inner surface of the brake drum corresponding to the central point of the brake band to a point adjacent to the end of the link is first measured off, and a point as 122 is indicated. Then, assuming that the brake band lining is new or of full thickness and the band is in its retracted position, a similar arcuate distance is measured from the central point 123 of the outer surface of the lining, and this second point 124 is indicated.

An arc, as the dotted arc 125, is next constructed which would indicate the surface of the band when substantially worn out, and a similar distance is measured from the then middle point 126 of this arc, and the distance is indicated by a third point 127. An arc 128 of a circle is then constructed, passing through the three points 122, 124 and 127 indicated, and the center 129 of this arc represents the point at which the link should be pivoted. The link will then cause the brake band, when new, to travel such a path when forced into operative position that the second point 124 will be brought into juxtaposition with the first point 122 upon tightening of the brake band before the end of the band will engage the drum. Thus the band will be caused to engage the drum substantially simultaneously throughout its entire length.

Assuming the band is worn down to the line 125 assumed in connection with the location of the third point 127, again if the brake band is operated, the third point will be brought into juxtaposition with the first point 122 located, before the brake band adjacent to the bracket member can engage the drum, and again the brake band will engage the drum substantially simultaneously throughout its entire length. By this means, the pivot point of the link has been fixed so as to be perfectly located for the band when in its unworn condition, and again when it is in its substantially worn out condition. For degrees of wear between, there will perhaps be some slight variation, but if a certain portion of the band receives relatively greater wear during the first part of this period, it will receive relatively less wear during the latter part of this period, so that for the entire life of the brake band, the wear on the several parts will be substantially equalized and at all times the band will be so operated as to engage the brake drum throughout its length substantially simultaneously.

A cam slot or other similar guiding means can obviously be provided which will cause the end of the band to follow an absolutely correct path, but the approximate path provided by the guiding link arrangement herein disclosed will, in most cases, be found to give very beneficial results. If desired, the length of the guide link may be somewhat decreased and still attain very satisfactory results.

Thus the bands have a much more effective operation. Not only is the operation of the bands more effective, but due to the fact that the wear on the brake lining is substantially equally distributed throughout the length of the brake band, the length of service of the brake band is materially increased.

When the pressure on the fluid in the system is removed, the springs such as 77, Fig. 4, and 108, Fig. 7, act to move the pistons of each of the cylinders toward each other and thus force the liquid back through the tubing of the system and into the pressure cylinder 8. In a pneumatic pressure system, the pressure in the brake cylinders may be released merely by permitting the air in the tubing to escape.

While in the drawings and specification, the invention has been disclosed as applied to an internal brake, it is to be understood that features of the invention are equally applicable to brakes of types other than the specific form herein shown. It is also to be understood that modifications in the specific embodiment herein disclosed are contemplated, and that the invention is to be limited merely by the scope of the appended claims.

What I claim as new and desire to secure by Letters Patent is:—

1. In a braking apparatus, a brake drum, a brake band adjacent thereto, means for applying braking pressure to said band, and means engaging said brake band adjacent to the end thereof for preventing the engagement of said brake band adjacent to its end with the drum during the initial movement of said band, said means operating to bring said brake band end into engagement with said drum as the brake band reaches its operative position.

2. In a braking apparatus, a brake drum, a brake band adjacent thereto, means for applying braking pressure to said band adjacent to the end thereof, and a link having one end pivotally joined to said band adjacent to the end thereof, the other end of said link being pivotally supported at a point such that said link is at all times at an angle to the radius of said drum which passes through the pivot of said link to said band.

3. In a braking apparatus, a brake drum, a brake band adjacent thereto, means for applying braking pressure to said band adjacent to the end thereof, a link having one end pivotally joined to said band adjacent to the end of the band, the other end of said link being pivotally supported at a point fixed in relation to said drum, and a spring exerting tension on said link and tending to force said end of said band from engagement with said drum.

4. In a braking apparatus, a brake drum, a brake band adjacent thereto and having ends adjacent to each other, means for applying braking pressure in opposite directions to said ends of said band, links joined to the respective ends of said band for causing said ends to travel arcuate paths during their initial movement, said links being so arranged as to never occupy a radial position, and a spring joining said links and tending to force said ends of said band from engagement with said drum.

5. In a braking apparatus, a brake drum, a brake band within said drum and adjacent thereto, the ends of said band being adjacent to each other, means for exerting a pressure on said ends in opposite directions to cause the band to engage said drum, links each joined at one end to one of said ends of said band, the opposite end of each link being mounted on a fixed pivot, said links being so arranged as to guide the end of the brake band along the arc of a circle which intersects the circle of the inner surface of the brake drum at an acute angle.

6. In a braking apparatus, a brake drum, a brake band within said drum and adjacent thereto, said brake band having ends adjacent to each other, a cylinder, pistons within said cylinder and movable from each other upon application of fluid pressure within said cylinder intermediate of said pistons, means joining each of said pistons to a corresponding one of said ends, and links, each of said links being pivotally joined at one end to one of said ends of said band, and the other end of each of said links being pivotally supported at a point within said brake drum.

7. In combination with a brake drum, a flexible internal brake band, a wear lining between the flexible band and the brake drum, supporting means for the band located substantially midway between the ends thereof and permitting movement of the band toward and from the drum to permit engagement of the wear lining with the drum and to compensate for wear in the wear lining, means for moving the free ends of the brake band to press the wear lining into contact with the drum, and means for guiding the movement of the free ends of the brake band along a predetermined line of movement whereby the wear lining will be caused to press against the drum with substantially equal pressure throughout the circumference of the lining regardless of the worn condition of said lining whereby the lining will be substantially equally worn throughout.

8. The combination with a brake drum of a C-shaped flexible band, a wear lining between the band and the drum, means connected with the free ends of the band for moving the band toward the drum to compress the wear lining between the band and the drum, and means for guiding the free ends of the band so that they can approach the drum only along predetermined lines, said lines being substantially co-incident with the lines of movement traveled by points on the free ends of the band as the band approaches and withdraws from the drum when maintained parallel with the drum and an intermediate point of said band moves radially of said drum.

In witness whereof, I hereunto subscribe my name this 9th day of January, 1922.

MALCOLM LOUGHEAD.

Witnesses:
EMILE J. BOURGEOIS,
DAGMAR PETERSON.